US012767259B2

(12) United States Patent
Baptist et al.

(10) Patent No.: US 12,767,259 B2
(45) Date of Patent: Oct. 20, 2026

(54) TANK DEVICE FOR A MOTORCYCLE, AND LUGGAGE SYSTEM FOR A MOTORCYCLE

(71) Applicant: Bayerische Motoren Werke Aktiengesellschaft, Munich (DE)

(72) Inventors: Eva Baptist, Haigerloch (DE); Jean-Thomas Mayer, Munich (DE); Rainer Wamser, Emmering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 286 days.

(21) Appl. No.: 18/696,079

(22) PCT Filed: Nov. 7, 2022

(86) PCT No.: PCT/EP2022/080952

§ 371 (c)(1),
(2) Date: Mar. 27, 2024

(87) PCT Pub. No.: WO2023/099122

PCT Pub. Date: Jun. 8, 2023

(65) Prior Publication Data

US 2024/0383555 A1 Nov. 21, 2024

(30) Foreign Application Priority Data

Dec. 2, 2021 (DE) ..................... 10 2021 131 787.8

(51) Int. Cl.

| | |
|---|---|
| ***B62J 9/25*** | (2020.01) |
| ***B62J 9/27*** | (2020.01) |
| ***B62J 35/00*** | (2006.01) |

(52) U.S. Cl.
CPC . *B62J 9/25* (2020.02); *B62J 9/27* (2020.02); *B62J 35/00* (2013.01)

(58) Field of Classification Search
CPC ................. B62J 9/25; B62J 9/27; B62J 35/00
See application file for complete search history.

(56) References Cited

U.S. PATENT DOCUMENTS 4,068,859 A * 1/1978 Dittman .................. B62J 35/00 224/419
4,469,256 A * 9/1984 McEwen .................. B62J 9/25 224/463

(Continued)

FOREIGN PATENT DOCUMENTS

DE 35 05 703 A1 10/1985
DE 20 2004 014 057 U1 11/2004

(Continued)

OTHER PUBLICATIONS

JP-2015112984-A (Year: 2015).*

(Continued)

*Primary Examiner* — Christopher B Wehrly
(74) *Attorney, Agent, or Firm* — Crowell & Moring LLP

(57) ABSTRACT

A tank device for a motorcycle includes a fuel tank, a tank cap which can expose and close a tank filling opening of the fuel tank, and a fastening device. The fastening device has at least two fastening elements which are mounted in a positionally fixed manner on the fuel tank and by which a tank bag can be fastened to the tank device exclusively via the fuel tank.

16 Claims, 1 Drawing Sheet

(56) References Cited

U.S. PATENT DOCUMENTS

| | | | | |
|---|---|---|---|---|
| 6,095,473 | A * | 8/2000 | Engers | B62J 7/08 248/339 |
| 6,974,059 | B2 | 12/2005 | Alderman | |
| 2015/0191210 | A1 | 7/2015 | Visenzi | |
| 2017/0190372 | A1* | 7/2017 | Rucker | B62J 9/25 |

FOREIGN PATENT DOCUMENTS

| | | | | |
|---|---|---|---|---|
| DE | 10 2004 057 128 | A1 | 6/2006 | |
| DE | 20 2006 001 479 | U1 | 6/2007 | |
| DE | 20 2010 005 660 | U1 | 10/2011 | |
| DE | 10 2010 037 912 | A1 | 4/2012 | |
| DE | 20 2013 011 944 | U1 | 3/2015 | |
| JP | 2015112984 | A * | 6/2015 | B62J 9/25 |

OTHER PUBLICATIONS

International Search Report (PCT/ISA/210) issued in PCT Application No. PCT/EP2022/080952 dated Jan. 30, 2023 with English translation (5 pages).
German-language Written Opinion (PCT/ISA/237) issued in PCT Application No. PCT/EP2022/080952 dated Jan. 30, 2023 with English translation (7 pages).
German-language Search Report issued in German Application No. 10 2021 131 787.8 dated May 18, 2022 with partial English translation (12 pages).
English translation of Chinese-language Office Action issued in Chinese Application No. 202280063139.3 dated May 9, 2026 (10 pages).

* cited by examiner

TANK DEVICE FOR A MOTORCYCLE, AND LUGGAGE SYSTEM FOR A MOTORCYCLE

BACKGROUND AND SUMMARY

The present invention relates to a tank device for a motorcycle, and to a luggage system for a motorcycle.

U.S. Pat. No. 6,974,059 B2 has already disclosed a fastening system for mounting an item of luggage on a fuel tank of a motorcycle. The fastening system consists of two separate parts, a tank locking sleeve and a fastening sleeve which is fastened to the item of luggage. The tank locking sleeve is to be fastened to a tank cap of the fuel tank. The tank cap is located on a flat top side of the fuel tank and can be fastened to the fuel tank with the aid of fastening screws which are guided through an edge flange forming an encircling fastening flange of the tank cap.

DE 20 2013 011 944 U1 discloses a case for motorcycles, wherein the case comprises a basic body on which a holding structure is held which in turn can be secured to a fixed structure of the motorcycle.

It is the object of the present invention to provide a solution which permits a particularly simple and secure fastening of a tank bag to a motorcycle.

This object is achieved according to the invention by the subject matter of the independent patent claims. Further possible refinements of the invention are disclosed in the dependent claims, the description and the figures.

The invention relates to a tank device for a motorcycle. The motorcycle is a land vehicle which is moved by engine power, is not rail-bound and runs on not more than two wheels. The motorcycle may be, for example, a motorbike, a scooter or a moped. The tank device comprises a fuel tank which is designed to receive fuel for the motorcycle. The motorcycle can be driven by means of the fuel. For driving of the motorcycle, the fuel can be supplied to an internal combustion engine of the motorcycle and burned in the internal combustion engine. The fuel tank defines a tank volume in which the fuel can be accommodated. The tank device furthermore comprises a tank cap which can open up and close a tank filling opening of the fuel tank. Via the tank filling opening, fuel can be filled into the tank volume of the fuel tank, for example during a fueling process. The tank cap can have, for example, a fastening flange held on the fuel tank and a cap element which is pivotable about a pivot axis relative to the fastening flange. The fastening flange can be arranged on the fuel tank in a manner surrounding the tank filling opening circumferentially, wherein the cap element is designed to open up the tank filling opening in an opening-up position of the cap element and to close the tank filling opening in a closed position of the cap element.

The tank device furthermore comprises a fastening device which comprises at least two fastening elements. The fastening elements are arranged in a positionally fixed manner on the fuel tank. Furthermore, via the fastening elements, a tank bag can be fastened to the tank device exclusively via the fuel tank. This means that the tank bag is not fastened to the tank device via the tank cap. The fastening elements can be brought into engagement with corresponding holding elements of the tank bag in order to fasten the tank bag to the tank device. The tank bag can therefore be fastened to the motorcycle via the at least two fastening elements when the tank device is installed in the motorcycle. If the tank bag is held on the tank device via the fastening device, the tank bag can then be arranged so as to outwardly overlap the tank cap. By the fastening elements being held exclusively on the fuel tank and, in consequence, the tank bag being fastened to the tank device exclusively via the fuel tank, introduction of force via the tank bag into the tank cap of the tank device can be kept particularly low, in particular can be completely avoided. As a result, it is possible to observe safety-relevant requirements that state that the risk of damage to the tank cap of the tank device should be kept particularly low. By means of the positionally fixed arrangement of the fastening elements on the fuel tank, the fastening elements can be brought particularly simply and rapidly into engagement with the holding elements of the tank bag, as a result of which the tank bag can be fastened to the tank device particularly simply and rapidly. A time-consuming alignment of the fastening elements with respect to one another and/or with respect to the holding elements of the tank bag can therefore be omitted.

In one possible development of the invention, it is provided that the fastening device comprises at least one holding plate which is fastened to the fuel tank in an integrally bonded manner and via which at least one of the fastening elements is held on the fuel tank. In particular, at least one of the fastening elements can be arranged upstream of the tank cap in the longitudinal direction of the vehicle and the at least one other of the fastening elements can be arranged downstream of the tank cap in the longitudinal direction of the motorcycle. In this case, both fastening elements can be held on the fuel tank via the same holding plate or via respective separate holding plates. In particular, the respective fastening elements are fastened directly to the respective associated holding plate, as a result of which the fastening elements are fastened particularly securely to the fuel tank via the respective holding plate. For example, the at least one holding plate can be welded to the fuel tank, as a result of which the respective holding plate is held particularly securely on the fuel tank.

In a further possible refinement of the invention, it is provided that the fastening device is designed to fail under a lower action of force than the fuel tank. This means that, when force is introduced into the tank device, the fastening device fails before the fuel tank. Failure may include, for example, breaking or tearing of the fastening device. Thus, at least a portion of the action of force can be converted by the failure into deformation energy of the fastening device, as a result of which the fuel tank is subject to particularly little stress. By this means, a risk of damage to the fuel tank in particular in the event of an action of force on the tank device via the tank bag can be kept particularly low.

The invention furthermore relates to a luggage system for a motorcycle, comprising a tank device as has already been described in conjunction with the tank device according to the invention. Furthermore, the luggage system comprises a tank bag which has at least two holding elements corresponding to the fastening elements. Where both the fastening elements and the holding elements are meant below, they are then referred to in general as elements. The elements are designed to be brought into engagement with each other in order to fasten the tank bag to the tank device, as a result of which the tank bag is held on the tank device exclusively via the fuel tank. This means that respective fastening elements can be brought into engagement with the assigned corresponding holding elements in order to fasten the tank bag to the fuel tank. The luggage system therefore comprises the tank device and the tank bag, wherein the tank bag can be mounted separately and therefore spaced apart from the tank device or can be held on the tank device. For particularly simple fastening of the tank bag to the tank device, it can be provided that the holding elements are arranged in a positionally fixed manner on the tank bag, as a result of which the holding elements can be brought particularly simply and rapidly into engagement with the fastening elements which are arranged in a positionally fixed manner on the fuel tank and are assigned to the respective holding elements. In particular, the respective fastening elements together with the assigned holding elements can form a respective quick closure via which the tank bag can be fastened particularly simply and rapidly to the fuel tank. The luggage system therefore permits a particularly convenient, simple and rapid fastening of the tank bag to the tank device.

In one possible development of the invention, it is provided that at least one of the elements is in the form of a hook which is designed to engage around a clip of the corresponding element. In other words, the hook can be hooked into a clip of the corresponding element and can therefore engage around the clip. The clip should be understood as meaning a slender object which may be curved or straight. The interlocking of the element in the form of a hook with the clip of the corresponding element permits a particularly simple connection and particularly secure holding of the elements brought into engagement with one another on one another.

In this connection, it can be provided, in a further possible refinement, that the hook is designed to be pivoted relative to the fastening device while the tank bag is held on the tank device, and the at least one element having the hook additionally comprises a spring device which is designed to hold the hook in a predetermined closed position for interlocking with the clip. This means that the hook can be released from the clip only when a spring force of the spring device is overcome. The spring device therefore serves to avoid the hook from being undesirably released from the clip. Only by the spring force of the spring device being overcome is the hook adjustable from the predetermined closed position into a predetermined open position, in which the hook can be released from the clip. As a result, the spring device permits particularly secure holding of the hook on the clip and therefore secure holding of the tank bag on the tank device. The hook can be designed to be pivoted both relative to the fastening device and relative to a component of the tank bag, for example relative to a carrier plate of the tank bag.

In a further possible refinement of the invention, it is provided that the clip defines a pivot axis for the tank bag, about which the tank bag held on the tank device can be pivoted, as a result of which the tank filling opening can be opened up. The tank bag can therefore be pivoted about the pivot axis between an overlapping position outwardly overlapping the tank cap and a pivoted-away position not outwardly overlapping the tank cap. Therefore, in the pivoted-away position, the tank bag is pivoted away from the tank cap in such a manner that the cap element can be opened and therefore the filling opening can be opened up. Complete detachment of the tank bag from the tank device in order to fill the fuel tank with the fuel via the tank filling opening during a fueling process is therefore not absolutely necessary. During the fueling process, the tank bag can therefore continue to be held on the tank device. After the fueling process is ended, the tank filling opening can be closed by means of the cap element and then the tank bag can be pivoted back from the pivoted-away position into the overlapping position. In this overlapping position, the tank bag lies particularly closely to the fuel tank, as a result of which the tank bag can be held particularly securely on the tank device and, furthermore, particularly advantageous aerodynamics of the motorcycle can be achieved. The clip defining the pivot axis for the tank bag therefore makes it possible for the tank bag to be able to be continuously held on the tank device during the fueling process.

In a further possible refinement of the invention, it is provided that at least one of the elements has a compartment into which an insertion region of the corresponding element can be inserted for bringing the elements into engagement. The compartment should be understood as meaning in particular a part of the element that is divided from an adjacent environment by a fixed, in particular rigid material and serves for storing something. The insertion region of the corresponding element can be inserted into this compartment, as a result of which the mutually corresponding elements can be fastened to one another. The insertion region of the corresponding element can be designed, for example, as a shoe or as a hook which can be inserted into the compartment in order to bring the elements into engagement. In the inserted state of the insertion region into the compartment, the compartment can completely surround the insertion region of the corresponding element circumferentially such that the insertion region is completely outwardly circumferentially surrounded by the compartment perpendicularly to an insertion direction of the insertion region into the compartment. By this means, the insertion region of the one element can be held particularly securely in the compartment of the other element.

In a further possible refinement of the invention, it is provided that the tank bag has at least one buffer element via which the tank bag can be supported on the fuel tank. The buffer elements are in particular elastic. For example, the at least one buffer element is a rubber buffer. The tank bag can be supported and mounted resiliently on the fuel tank by means of the at least one buffer element. An action of force on the fuel tank from the tank bag can therefore be cushioned in a supporting direction of the at least one buffer element on the fuel tank, as a result of which a risk of damage to the fuel tank can be kept particularly low. Furthermore, direct resting of the tank bag on the tank cap can be avoided by means of the at least one buffer element, and therefore a risk of force being introduced into the tank cap via the tank bag can be kept particularly low.

In a further possible refinement of the invention, it is provided that the tank bag has a stiff carrier plate in which the holding elements are arranged. In particular, the tank bag with the stiff carrier plate is arranged on the tank device so as to face the fuel tank when the tank bag is fastened to the tank device. In addition, the at least one buffer element can be arranged on the stiff carrier plate, with the stiff carrier plate being able to be resiliently supported against the fuel tank via the at least one buffer element. The stiff carrier plate can have a gap with respect to the tank cap, and can therefore be arranged spaced apart from the tank cap, when the tank bag is fastened to the tank device. The gap can be maintained here in particular by means of the at least one buffer element. As a result, there is no direct contact between the tank bag and the tank cap. A direct transmission of force to the tank cap from the tank bag can therefore be avoided, as a result of which a risk of damage to the tank cap can be kept particularly low. In this connection, the transmission of force describes a technical possibility of transmitting a force or a torque to the tank cap from the tank bag. There is therefore no direct force-transmitting connection between the tank bag and the tank cap. By means of the stiff configuration of the carrier plate, sagging of the tank bag on its side having the carrier plate can be at least substantially avoided, as a result of which the direct contact between the carrier plate of the tank bag and the tank cover can be particularly reliably prevented. The stiff carrier plate furthermore permits particularly reliable stabilizing of the tank bag.

Advantages and advantageous developments of the tank device according to the invention should be considered to be advantages and advantageous developments of the luggage system according to the invention, and vice versa.

Further features of the invention may become apparent from the claims, the figures and the description of the figures. The features and combinations of features mentioned above in the description and the features and combinations of features shown below in the description of the figures and/or in the figures alone can be used not only in the respectively stated combination, but also in different combinations or on their own without departing from the scope of the invention.

BRIEF DESCRIPTION OF THE DRAWINGS

In the figures, identical and functionally identical elements are provided with the same reference signs.

DETAILED DESCRIPTION OF THE DRAWINGS

Figure 1:
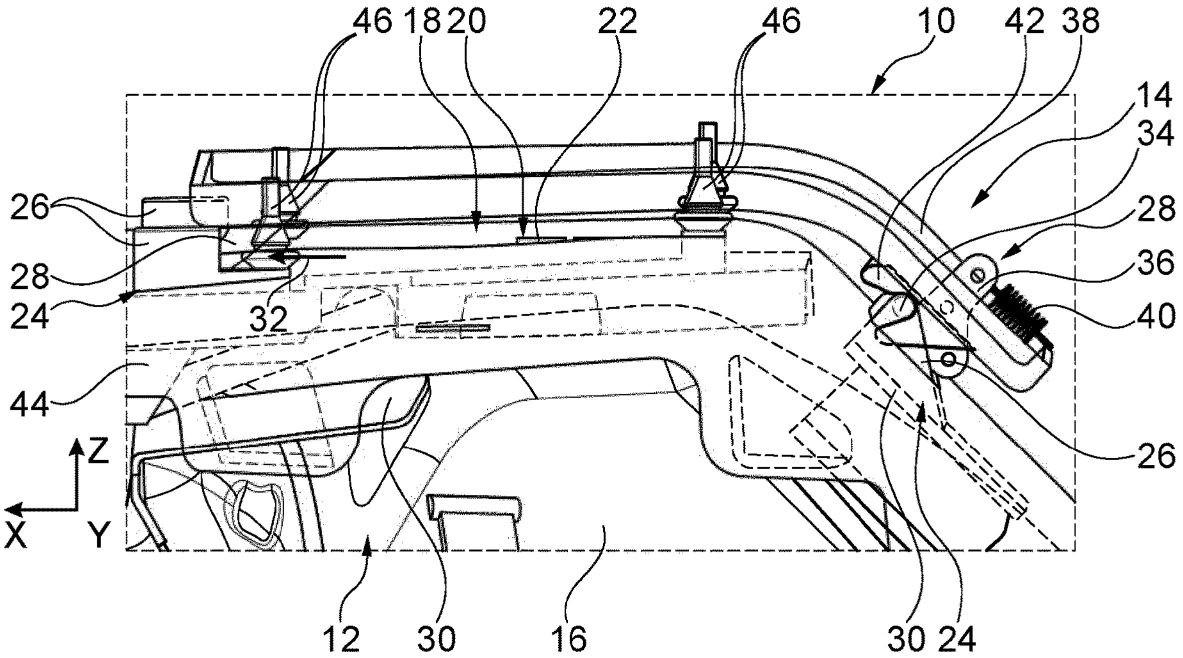
FIG. 1 is a schematic side view of a luggage system for a motorcycle in a first embodiment, with a tank device on which a tank bag is held, wherein the tank bag is only partially illustrated for reasons of clarity.
Figure 2:
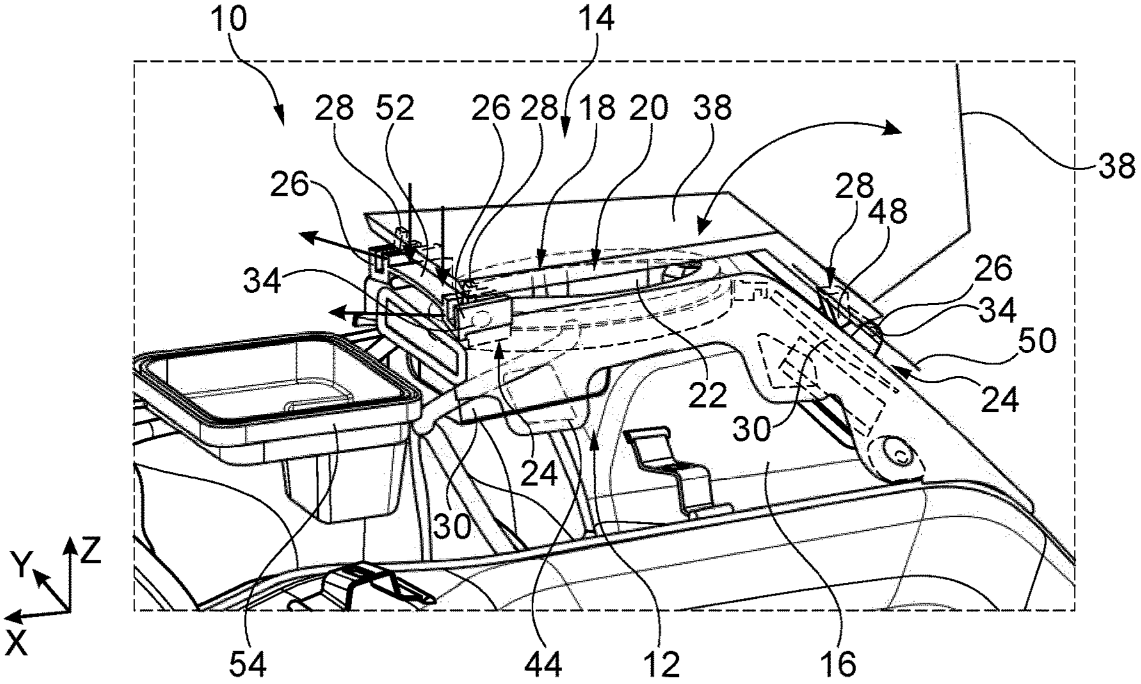
FIG. 2 is a schematic perspective view of the luggage system in a second embodiment, in which the tank device comprises a fastening device which has three fastening elements which are each in the form of clips.

FIGS. 1 and 2 each illustrate different embodiments of a luggage system 10 for a motorcycle. The respective features of the luggage system 10 shown in FIG. 1 and of the luggage system 10 shown in FIG. 2 can be freely combined with one another here. In each embodiment, the luggage system 10 comprises a tank device 12 and a tank bag 14, which is only partially illustrated here for reasons of clarity. The luggage system 10 makes it possible for an item of luggage to be able to be transported on the motorcycle by means of the tank bag 14 when the tank bag 14 is fastened to the tank device 12.

The tank device 12 comprises a fuel tank 16 which surrounds a tank volume in which a fuel can be accommodated. Furthermore, the tank device 12 comprises a tank cap 18 which can open up and close a tank filling opening 20 of the fuel tank 16. The tank cap 18 comprises a fastening flange 22, via which the tank cap 18 is held on the fuel tank 16, and a cap element which is not illustrated in the figures and can be adjusted relative to the fastening flange 22 between an open position and a closed position. In the open position of the cap element, the tank filling opening 20 of the fuel tank 16 is opened up so that fuel can be filled into the fuel tank 16 via the tank filling opening 20. In the closed position of the cap element, the tank filling opening 20 is closed.

The tank device 12 furthermore comprises a fastening device 24, by means of which the tank bag 14 can be fastened to the tank device 12 exclusively via the fuel tank 16. In each of the illustrated embodiments, the fastening device 24 here comprises three fastening elements 26 which are arranged in a positionally fixed manner on the fuel tank 16. In each of the illustrated embodiments, two of the fastening elements 26 are arranged upstream of the tank cap 18 in the longitudinal direction x of the motorcycle and the third fastening element 26 is arranged downstream of the tank cap 18 of the tank device 12 in the longitudinal direction x of the vehicle. The respective fastening elements 26 are designed to be brought into engagement with corresponding holding elements 28 of the tank bag 14, as a result of which the tank bag 14 can be fastened to the fuel tank 16 via the fastening elements 26. In the present case, the tank bag 14 has a corresponding holding element 28 for each fastening element 26.

For particularly secure holding of the fastening elements 26 on the fuel tank 16, the tank device 12 here comprises two holding plates 30 which are both connected, in the present case are welded, to the fuel tank 16 in an integrally bonded manner. The two fastening elements 26 which are arranged upstream of the tank cap 18 in the longitudinal direction x of the vehicle are fastened here to the fuel tank 16 via a common holding plate 30. The third fastening element 26 is held on the fuel tank 16 via the further holding plate 30.

In the first embodiment of the tank device 12 that is shown in FIG. 1, the two fastening elements 26 which are arranged upstream of the tank cap 18 in the longitudinal direction x of the vehicle are in the form of compartments into which respective assigned insertion regions of the corresponding holding elements 28 can be inserted in an insertion direction 32. The fastening element 26 arranged downstream of the tank cap 18 in the longitudinal direction x of the vehicle has a clip 34, which is merely indicated in FIG. 1 and which can be engaged around by the assigned holding element 28. The holding element 28 of the tank bag 14, which holding element is designed to engage around the clip 34, is in the form of a snap-action hook here. The snap-action hook comprises a hook 36 which is designed to be pivoted relative to the fastening device 24 while the tank bag 14 is held on the tank device 12. The hook 36 is designed here to be pivoted relative to a carrier plate 38 of the tank bag 14 in order to engage around the clip 34. The snap-action hook here comprises, in addition to the hook 36, a spring device 40 which is designed to hold the hook 36 in a predetermined closed position in which the hook 36 engages around the clip 34. The hook 36 can therefore be released from the clip 34 only by a spring force of the spring device 40 being overcome. For fastening the tank bag 14 to the tank device 12, it is therefore provided in the first embodiment that the insertion regions of the front holding elements 28 in the longitudinal direction x of the vehicle are inserted into the compartments provided by the front fastening elements 26 in the longitudinal direction x of the vehicle and then the hook 36 is brought into engagement with the clip 34.

In order to permit precise positioning of the hook 36 relative to the clip 34 in the transverse direction y of the vehicle, a guide device 42 can additionally be provided on the tank bag 14. In the present case, the guide device 42 comprises two fork elements which are each fork-shaped with two prongs. The fork elements can each be pushed on the clip 34 in such a manner that the clip 34 strikes against the respective fork element in a connecting region of the two prongs. The respective fork elements can outwardly overlap the hook 36 on mutually opposite sides at least in regions in the transverse direction y of the vehicle, as a result of which the hook 36 can be centered on the clip 34 in the transverse direction y of the vehicle.

The front fastening elements 26 are formed integrally here with a storage compartment 54 which is held on the assigned holding plate 30 via a screw connection. After the storage compartment 54 is fastened to the fuel tank 16 via the holding plate 30, a tank cover 44 can be pulled over the fuel tank 16 and fastened to the fuel tank 16. The clip 34 can be held on the assigned holding plate 30 via a screw connection. For fastening the tank bag 14 to the tank device 12, the holding elements 28 engage with the insertion regions in the compartments at the front, which are formed integrally with the storage compartment 54. At the rear, the tank bag 14 is locked to the tank device 12 via the snap-action hook. The snap-action hook can be unlocked via a supporting strap which can be fastened to the hook 36 of the snap-action hook. By way of a pulling action on the supporting strap, the spring force of the spring device 40 can be overcome and the hook 36 released from the clip 34.

The tank bag 14 comprises the stiff carrier plate 38 to which the holding elements 28 are fastened. Additionally, four buffer elements 46 are arranged here on the carrier plate 38 and can be used to support the carrier plate 38 on the tank device 12. The tank bag 14 can be supported via the buffer elements 46 on the tank cover 44 and indirectly via the tank cover 44 on the fuel tank 16. In the present case, the buffer elements 46 are in the form of rubber buffers and make it possible for the carrier plate 38 to be supported on the fuel tank 16.

The second embodiment of the luggage system 10 shown in FIG. 2 comprises the tank device 12 and the tank bag 14. In this case, no buffer elements 46 of the tank bag 14 are illustrated, but in this embodiment too the tank bag 14 may have at least one buffer element 46. The fastening element 26 arranged downstream of the tank cap 18 in the longitudinal direction x of the vehicle in the present case has the clip 34 which can be engaged around by a fastening hook 48 of the tank bag 14. The fastening hook 48 here is the holding element 28 which corresponds to the fastening element 26. The fastening hook 48 can be arranged in particular fixedly and therefore non-pivotably relative to the carrier plate 38. The engagement around the clip 34 by means of the fastening hook 48 permits pivoting of the carrier plate 38 about a pivot axis 50 defined by the clip 34. By this means, the tank bag 14 can be pivoted about the pivot axis 50, as indicated in FIG. 2, away from the tank filling opening 20 and therefore rearward in the longitudinal direction x of the vehicle, and forward toward the tank filling opening 20, as a result of which the tank bag 14 can be arranged outwardly overlapping the tank filling opening 20. Consequently, depending on the pivot position about the pivot axis 50, the tank bag 14 can open up or outwardly overlap the tank filling opening 20.

In the second embodiment here, the front fastening elements 26 which are arranged upstream of the tank cap 18 in the longitudinal direction x of the motorcycle are each in the form of clips 34. The holding elements 28 of the tank bag 14 that correspond with the fastening elements 26 are each in the form of snap-action hooks here. Furthermore, for particularly precise positioning relative to one another, the front fastening elements 26 are connected to one another via a connecting clip 52 connecting the fastening elements 26.

In order to provide the second embodiment of the luggage system 10, the storage compartment 54 can be fastened to the fuel tank 16 via the assigned holding plate 30 analogously to the first embodiment. The tank cover 44 can subsequently be pulled over the fuel tank 16. The connecting clip 52 can then be fastened by the fastening elements 26 to the assigned holding plate 30 indirectly via the storage compartment 54 or directly to the assigned holding plate 30. In order to fasten the tank bag 14 to the tank device 12, the fastening hook 48 can be hooked in place around the clip 34 of the corresponding fastening element 26. For this purpose, the carrier plate 38 of the tank bag 14 can be arranged in the rearwardly pivoted position and therefore in the pivoted-away position relative to the fuel tank 16 in order to permit particularly simple hooking in of the fastening hook 48 at the assigned clip 34. After the fastening hook 48 has been hooked in at the assigned clip 34, the carrier plate 38 can be folded forward about the pivot axis 50 in the longitudinal direction x of the vehicle and the tank bag 14 can be locked to the fastening elements 26 via the snap-action hooks of the front holding elements 28. A respective connection of the front holding elements 28 to the assigned fastening elements 26 can be unlocked via supporting straps held on the respective snap-action hooks, with the snap-action hooks being able to be released from the assigned clips 34 by a pulling action on the respective supporting straps.

The luggage system 10 permits rapid fastening of the tank bag 14 to the tank device 12 without tensioning straps. Conventional solutions in which the tank bag 14 is fastened to the tank cap 18 entail the risk of the tank cap 18 becoming leaky over the service life of the motorcycle. Furthermore, it is not possible to ensure that the tank device 12 remains leakproof in the event of an accident.

The tank device 12 described in conjunction with the figures permits the tank bag 14 to be attached to the tank device 12, with safety-relevant requirements for the tank device 12 being able to be observed.

Vehicle-side fastening points provided by the fastening elements 26 for the tank bag 14 are fastened here to the fuel tank 16 separately from the tank cap 18. The fastening elements 26 are configured in such a manner that possible damage occurs at the fastening elements 26 and not at the fuel tank 16 or the tank cap 18. This means that the fastening device 24 is configured in such a manner that it fails under a lower action of force than the fuel tank 16. In the first embodiment of the luggage system 10, the tank bag 14 is fastened to the tank device 12 by the tank bag 14 being inserted on one side, here at the front in the longitudinal direction x of the vehicle, into the tank device 12 and being locked on the other side, here at the rear in the longitudinal direction x of the vehicle, to the tank device 12.

The tank cover 44 can be positioned with respect to the tank cap 18 via an adapter ring. The storage compartment 54 located upstream of the tank cap 18 in the longitudinal direction x of the vehicle is screwed to the assigned holding plate 30 which is welded to the fuel tank 16. Respective screw points can protrude through the tank cover 44, with a transmission of forces from the screw points via the tank cover 44 to the tank cap 18 being at least substantially avoided. It is therefore possible to avoid forces being introduced to the tank cap 18 via the storage compartment 54. The fastening elements 26 for a front attachment of the tank bag 14 in the longitudinal direction x of the vehicle can be screwed onto these screw points. The second holding plate 30 is welded to the fuel tank 16 downstream of the tank cap 18 in the longitudinal direction x of the vehicle. The clip 34 is screwed to this second holding plate 30. This clip 34 is configured in such a manner that it serves as a sacrificial part in the event of damage.

The tank bag 14 can be received at the front fastening elements 26 and locked at the rear fastening element 26 via the snap-action hook. Alternatively, the tank bag 14 can be received at the rear fastening element 26 and locked at the front fastening elements 26 via respective snap-action hooks. When the tank bag 14 is received via the rear fastening element 26, the tank bag 14 can be pivoted about the pivot axis 50, and therefore the tank bag 14 does not have to be removed from the tank device 12 for refueling of the fuel tank 16. In each of the explained embodiments, the locking takes place via a respective snap-action hook which is connected to a supporting strap or a supporting handle via which the lock can be opened. An alternative locking of respective connections of the tank bag 14 to the tank device 12 is also conceivable.

Overall, the invention shows how a quick-action closure for attaching the tank bag 14 to the tank device 12 can be provided.

LIST OF REFERENCE SIGNS

10 luggage system
12 tank device
14 tank bag
16 fuel tank
18 tank cap
20 tank filling opening
22 fastening flange
24 fastening device
26 fastening element
28 holding element
30 holding plate
32 insertion direction
34 clip
36 hook
38 carrier plate
40 spring device
42 guide device
44 tank cover
46 buffer element
48 fastening hook
50 pivot axis
52 connecting clip
54 storage compartment

What is claimed is:

1. A luggage system for a motorcycle, comprising:
a tank device comprising:
a fuel tank;
a tank cap which is configured to open up and close a tank filling opening of the fuel tank; and
a fastening device which comprises at least two fastening elements which are arranged in a positionally fixed manner on the fuel tank and via which a tank bag is fastenable to the tank device exclusively via the fuel tank; and
the tank bag, wherein the tank bag has at least two holding elements corresponding to the at least two fastening elements, wherein the at least two fastening elements and the at least two holding elements are designed to be brought into engagement with each other in order to fasten the tank bag to the tank device, whereby the tank bag is held on the tank device exclusively via the fuel tank, wherein at least one of the fastening or holding elements is in the form of a hook which is designed to engage around a clip of a corresponding element, and
the hook is designed to be pivoted relative to the fastening device when the tank bag is held on the tank device, and the at least one element having the hook additionally comprises a spring device which is designed to hold the hook in a predetermined closed position for interlocking with the clip, and/or
the clip defines a pivot axis for the tank bag, about which the tank bag held on the tank device is pivotable, whereby the tank filling opening is openable.

2. The tank device according to claim 1, wherein
the fastening device comprises at least one holding plate which is fastened to the fuel tank in an integrally bonded manner and via which at least one of the two fastening elements is held on the fuel tank.

3. The tank device according to claim 1, wherein
the fastening device is configured to fail under a lower action of force than the fuel tank.

4. The luggage system according to claim 1, wherein
at least one of the fastening or holding elements has a compartment into which an insertion region of the corresponding element is inserted for bringing the fastening or holding elements into engagement.

5. The luggage system according to claim 1, wherein
the tank bag has at least one buffer element via which the tank bag is supportable on the fuel tank.

6. The luggage system according to claim 1, wherein
the tank bag has a stiff carrier plate on which the at least two holding elements are arranged.

7. The tank device according to claim 1, wherein at least one of the at least two fastening elements is arranged upstream of the tank cap in a longitudinal direction of the motorcycle and at least one other of the at least two fastening elements is arranged downstream of the tank cap in the longitudinal direction of the motorcycle.

8. The tank device according to claim 1, wherein the fastening device comprises at least three fastening elements arranged in a positionally fixed manner on the fuel tank.

9. The tank device according to claim 1, further comprising a tank cover which is arranged on the fuel tank, wherein screw points protrude through the tank cover, and wherein the at least two fastening elements are screwed onto the screw points.

10. The tank device according to claim 2, wherein the at least one holding plate is welded to the fuel tank.

11. The luggage system according to claim 1, wherein the clip is part of one of the at least two fastening elements, and the hook is part of one of the at least two holding elements, the hook being a snap-action hook comprising the hook and a spring device.

12. The luggage system according to claim 1, wherein the hook is designed to be pivoted relative to a carrier plate of the tank bag in order to engage around the clip.

13. The luggage system according to claim 1, wherein the tank bag further comprises a guide device for positioning a hook relative to a clip in a transverse direction of the motorcycle, the guide device comprising two fork elements which are each fork-shaped with two prongs.

14. The luggage system according to claim 1, wherein the tank bag is pivotable about the pivot axis between an overlapping position overlapping the tank cap and a pivoted-away position not overlapping the tank cap.

15. The luggage system according to claim 1, wherein the tank bag has a stiff carrier plate spaced apart from the tank cap by a gap when the tank bag is fastened to the tank device, such that there is no direct force-transmitting connection between the tank bag and the tank cap.

16. The tank device according to claim 1, wherein at least one of the at least two fastening elements is held on the fuel tank via a holding plate and a screw connection, and the at least one of the at least two fastening elements is configured to serve as a sacrificial part in an event of damage.

* * * * *